Figure 1:
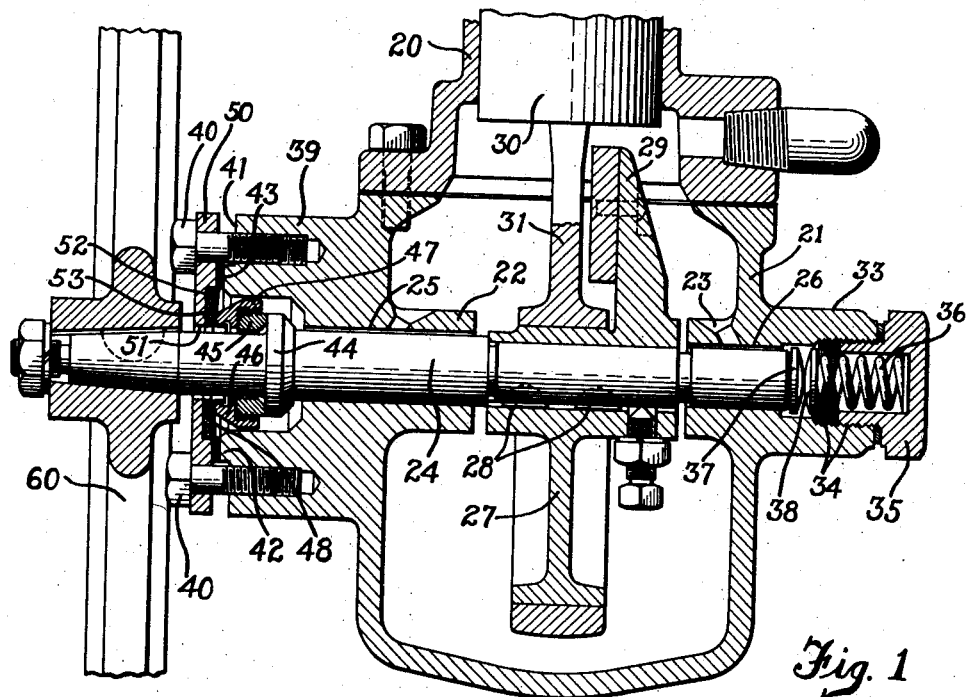

Jan. 27, 1931.                H. B. HULL                1,789,978
                         REFRIGERATING APPARATUS
                           Filed March 31, 1927

Inventor
Harry B Hull
By Spencer, Hardman, and Fehr
Attorney

Patented Jan. 27, 1931

1,789,978

UNITED STATES PATENT OFFICE

HARRY B. HULL, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed March 31, 1927. Serial No. 179,955.

This invention relates to improvements in sealing devices and particularly to the type of sealing devices for rotating shafts of compressors or like devices.

In the particular form in which the invention herein is illustrated a compressor is shown, such as is used in connection with refrigerator units. The compressor includes a crankcase and a crankshaft, one end of the latter extends through a wall of the crankcase and has means secured thereto for driving same. In machines of this type the refrigerant is usually drawn into the crankcase, whence, it passes to the compression chamber of the compressor.

A preferred manner of preventing the escape of gas from the crankcase is to provide a sealing surface on the crankshaft which engages a sealing surface of another sealing element. This latter element is carried by a flexible wall surrounding the shaft and secured to the crankcase.

One of the objects of the present invention is to simplify the construction of sealing devices, to facilitate the manufacture and reduce manufacturing costs thereof.

Another object of the invention is to utilize a diaphragm as the flexible wall and prevent distortion or fracture thereof. One manner of carrying out this object is to provide a backing for said diaphragm which limits the movement thereof.

A still further object of this invention is to provide a structure in which one of the sealing elements provides a thrust bearing for the driveshaft, which element is carried by the diaphragm. Said diaphragm and element are backed by a member of such resiliency so as to allow certain movement of said element whereby to maintain same in alignment at all times with a co-operating sealing element, and which member also prevents distortion of the diaphragm.

Further objects and advantages of the present invention will be apparent from the following description, reference being had to the accompanying drawings, wherein a preferred form of the present invention is clearly shown.

Figure 2:
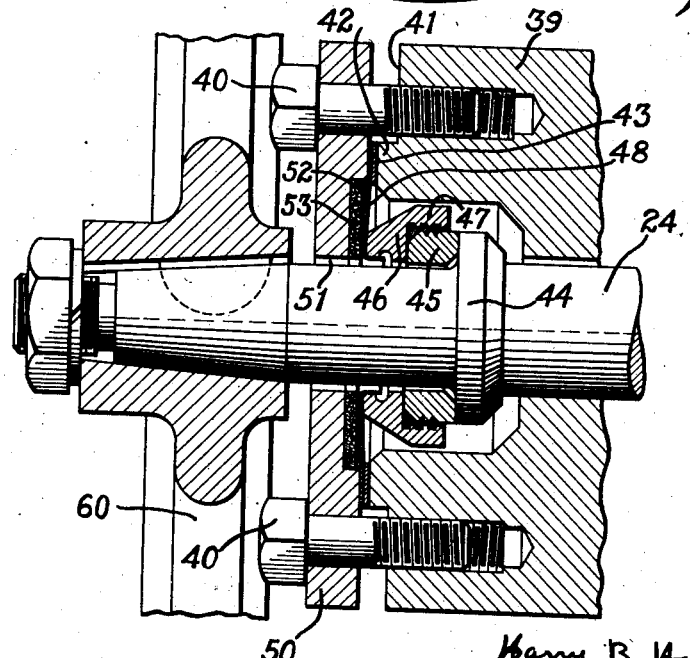

In the drawings:

Fig. 1 is a transverse sectional view of a compressor embodying the present invention, and Fig. 2 is a view showing the sealing device on an enlarged scale.

Referring to the drawings, the numeral 20 designates the cylinder of the compressor which is secured to the open end of the crankcase 21. Extending inwardly from opposite side walls of the crankcase 21 are two alignment bearing bosses 22 and 23 in which the driveshaft 24 is journalled. Grooves 25 and 26 formed in the bosses 22 and 23 provide lubricant ducts for the bearings. Between the bearing bosses 22 and 23, the shaft 24 has an eccentric 27 mounted thereon and secured thereto by keys 28. The eccentric 27 carries a counterbalance 29. A piston 30 in the cylinder 20 is connected with eccentric 27 by connecting rod 31.

A hollow annular extension 33 formed on the right side of the crankcase 21, as viewed in the drawing, has its recess portion provided with screw threads 34 which receive a nut 35. The nut 35 is hollow and receives a coil spring 36, one end of which abuts the inner wall of said nut. Two buttons 37 and 38 are interposed between the other end of spring 36 and the end of driveshaft 24. The buttons 37 and 38 are each provided with a convex surface facing one another. The flat surface of button 37 engages the end of shaft 24 and rotates therewith. The buttons provide a small engaging surface between the stationary and movable parts. In this manner friction at this point is minimized.

An annular hollow extension 39 on the other side of the crankcase 21 is screwthreaded for receiving bolts 40. The face 41 of the annular extension 39 has a small protuberance 42 which face is finished for the purpose of providing a smooth surface for a packing gasket 43.

The driveshaft 24 is provided with a circumferential flange or shoulder 44, which, when the shaft is in a proper assembled position, lies within the extension 39 adjacent the inner wall thereof. A bearing ring 45 of any suitable bearing metal, preferably a porous metal impregnated with a lubricant, surrounds the shaft 24 and one side thereof engages the flange 44 and provides a seal at this joint. The opposite side of ring 45 engages a retaining ring 46, said retaining ring surrounding the shaft 24 and providing an inwardly extending flange 47. The inner diameter of the flange 47 is larger than the outside diameter of the bearing ring 45 and the space therebetween is filled with a cementing substance such as red lead and glycerine.

A flexible wall herein shown as a metal diaphragm 48, is provided with a central opening for receiving the shaft 24. This shaft extends beyond the diaphragm and carries a driving member or flywheel 60. The inner edge of said diaphragm 48 is spun over and suitably secured to the inner edge of retaining ring 46. The outer edge of the diaphragm 48 lies adjacent packing gasket 43.

A clamping gland 50 located at the shaft opening in crankcase 21 is provided with a central aperture 51 for receiving shaft 24 and with apertures for receiving the bolts 40. When the bolts 40 are drawn up, the clamping gland 50 is pulled toward the annular extension 39, thus clamping the packing gasket 43 and the outer edge of the diaphragm 48 tightly between the finished surface of protuberance 42 and said gland 50. This provides a tight joint which prevents the leakage of fluid at this point of connection.

The spring 36 forces the flange 44 against the ring 45 and said ring functions as a thrust bearing for shaft 24. In a construction of this type it has been found necessary to provide a backing for the flexible diaphragm 48 to withstand the spring pressure and relatively high pressure of the gas sometimes present within the crankcase 21. Therefore, the inner surface of clamping gland 50 is counterbored at 52 to receive a resilient diaphragm backing member 53, which surrounds the shaft 24 and is adapted to be engaged by the diaphragm 48. In case of high pressure within the crankcase the member 53 backs the diaphragm 48 to limit its movement and thereby prevents excessive distortion and fracture thereof.

The backing member 53 can be depressed for the purpose of maintaining the bearing ring 45 and the shoulder 44 in alignment. Hence, if the clamping gland 50 is not secured properly, as for example, some of the bolts 40 being drawn tighter than others, there may be a tendency of misalignment of bearing ring 45 and shoulder 44. The pressure exerted by spring 36 will depress the backing member 53 sufficiently so that the sealing surfaces of the ring 45 and shoulder 44 will remain in sealing engagement with one another. Also in case of excessive clearance between the shaft 24 and its bearings, the shoulder 44 would tend to move out of alignment with the ring 45 if the compressor is lifted bodily by one end of the flywheel 60. By the present construction the backing member 53 will compress sufficiently to maintain the ring 45 in sealing engagement with the shoulder 44 at all times.

The backing member 53 may consist of any suitable resilient material, preferably a material comprising manila rope fiber and rubber, commonly known to the trade as "Vellumoid."

From the foregoing, it may be seen that the member 53 provides a backing for the sealing ring 45 so that it can function as a thrust bearing for the shaft 24 while at the same time providing flexibility whereby said ring may be maintained in alignment with the flange 44.

While the form of embodiment of the invention as herein described, constitutes a preferred form, it is to be understood that other forms might be adopted, all coming within the scope of the claims which follow:

What is claimed is as follows:

1. In combination, a case; a shaft journalled within the case and having one end thereof extending through a wall of the case; sealing means for the shaft opening in said wall including a shoulder on said shaft forming a sealing element, a second sealing element engaging said first element, means for forcing one of said elements toward the other, a flexible wall joined with the second element and case, a clamping gland secured to the case, and a resilient backing for said flexible wall interposed between said clamping gland and said second element.

2. In combination, a case; a shaft journalled within the case and having one end thereof extending through the wall of the case; sealing means for the shaft opening in said wall including a shoulder on said shaft forming a sealing element, a second sealing element engaging said first element, means for forcing one of said elements toward the other, a flexible wall joined with the second element and case, a clamping gland secured to the case, and a resilient backing for said flexible wall surrounding the shaft and interposed between the clamping gland and the flexible wall.

3. In a refrigerant compressor, a crankcasing, a shaft passing through said casing, a seal bearing surface on said shaft, a disklike diaphragm carrying a sealing member bearing on said surface, a clamping gland securing said diaphragm to said casing, and a resilient backing between said diaphragm and said gland.

4. In a refrigerant compressor, a crankcasing, a shaft passing through said casing, a seal bearing surface on said shaft, a disklike diaphragm carrying a sealing member bearing on said surface, a clamping gland securing said diaphragm to said casing and a resilient disk-like backing between said diaphragm and said gland.

5. In a refrigerant compressor, a crank-casing, a shaft passing through said casing, a seal bearing surface on said shaft, a disk-like diaphragm carrying a sealing member bearing on said surface, a clamping gland securing said diaphragm to said casing and a resilient disk-like backing between said diaphragm and said gland inserted in a counterbore in said gland.

6. In a refrigerant compressor, a crank-casing, a shaft passing through said casing, a seal bearing surface on said shaft, a disk-like diaphragm carrying a sealing member bearing on said surface, a clamping gland securing said diaphragm to said casing and a resilient disk-like fibrous backing between said diaphragm and said gland.

7. In a refrigerant compressor, a crank-casing, a shaft passing through said casing, a seal bearing surface on said shaft, a disk-like diaphragm carrying a sealing member bearing on said surface, a clamping gland securing said diaphragm to said casing and a resilient disk-like fibrous backing between said diaphragm and said backing inserted in a counterbore in said gland.

In testimony whereof I hereto affix my signature.

HARRY B. HULL.